(12) United States Patent
Hu et al.

(10) Patent No.: US 9,807,476 B2
(45) Date of Patent: Oct. 31, 2017

(54) MECHANISM FOR REMOTE SAFETY MONITORING SENSOR WITH LOW-POWER CONSUMPTION COMMUNICATION

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/090,653

(22) Filed: Apr. 5, 2016

(65) Prior Publication Data

US 2016/0301993 A1    Oct. 13, 2016

(51) Int. Cl.
*G08C 19/04* (2006.01)
*H04Q 9/00* (2006.01)

(52) U.S. Cl.
CPC ........... *H04Q 9/00* (2013.01); *H04Q 2209/10* (2013.01); *H04Q 2209/40* (2013.01); *H04Q 2209/823* (2013.01); *H04Q 2209/883* (2013.01)

(58) Field of Classification Search
None
See application file for complete search history.

(56) References Cited

U.S. PATENT DOCUMENTS

| | | | |
|---|---|---|---|
| 9,401,977 B1* | 7/2016 | Gaw | H04W 52/0254 |
| 2016/0260059 A1* | 9/2016 | Benjamin | G06Q 10/0832 |

* cited by examiner

*Primary Examiner* — Adolf Dsouza
(74) *Attorney, Agent, or Firm* — Joseph Kolodka

(57) ABSTRACT

Disclosed is a sensing platform including a server; one or more remote sensing systems coupled to the server, one or more local sensor(s) for target object monitoring; a wireless module coupled to a network through wireless a link; and a processor to read data from local sensor(s) and communicate information through the network using the wireless module. The sensing system has a low power consumption mode in which the processor puts the wireless module and the local sensor(s) in sleep mode or powered off. The processor has a sleep or deep sleep mode, a power-off mode, and a wake up mode, and the local sensor(s) are accessed at a frequency 1/T1 and the wireless module is at lower frequency 1/Tw where Tw>T1, and the server receives monitored value from remote sensing systems and interacts with the remote sensing system.

7 Claims, 4 Drawing Sheets

MECHANISM FOR REMOTE SAFETY MONITORING SENSOR WITH LOW-POWER CONSUMPTION COMMUNICATION

The present application claims priority to Provisional Application Ser. 62/144,628, the content of which is incorporated by reference.

BACKGROUND

Gas pipe leakage exposes high threat to life and property. Fixed point gas sensors and particularly those mounted at the manhole of the gas pipes are very helpful in early leakage detection and sending alarms, so that such leakage can be taken care of at the earliest time to avoid explosion. However, the power supply for such system is always a problem in that: 1) usually there's no power cable or at least power outlet; 2) solar battery may not work because of environmental limitations, for example the manhole is on a busy public road. So usually a regular battery is preferred to power the sensing system.

To report the monitored status and send alarms instantly, communication channels are needed to connect to a central monitoring station or to personals on duty. In most cases the gas vendor does not have communication cables routed together with the gas pipes, so reliable wireless communication is always the preferred solution. The major problem for low power solution such as ZigBee is that the transmission distance is too short, for example the normal distance for ZigBee is only 10~20 meters in 2.4 GHz band, while the manhole distances are usually 50 meters and above. So a convenient solution is using the paid services such as 3G or others.

Though a 3G device can be battery powered, comparing to the budgeted power consumption in manhole applications, it is still considerably high.

SUMMARY

A sensing platform includes a server; one or more remote sensing systems coupled to the central server, including: one or more local sensor(s) for target object monitoring; a wireless module coupled to a network through wireless a link; and a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system.

In another aspect, a system uses local monitoring and periodically report status using 3G (or other paid) channels. Under healthy/normal conditions, the status report via wireless communication has much longer intervals than local status checking. This interval is calculated by parameters including battery capacity, local monitoring power consumption, wireless communication power consumption, and desired battery life. Locally monitored status and instructions from monitoring center are exchanged during wireless link active period. Thresholds are defined either to decide local monitoring frequency, or to activate wireless communication and report alarms instantly. Sensing system and wireless link working status is monitored by the remote center to avoid system failure through the report message from the sensing system.

Advantages of the system may include one or more of the following. The system makes it possible to have long lasting battery powered sensor system, with instant remote alarm capability. The system can enable a reliable and fast alarm reporting, battery-powered system. Unlike communication devices such as ZigBee, the system provides a long communication distance.

DESCRIPTION

Figure 1:
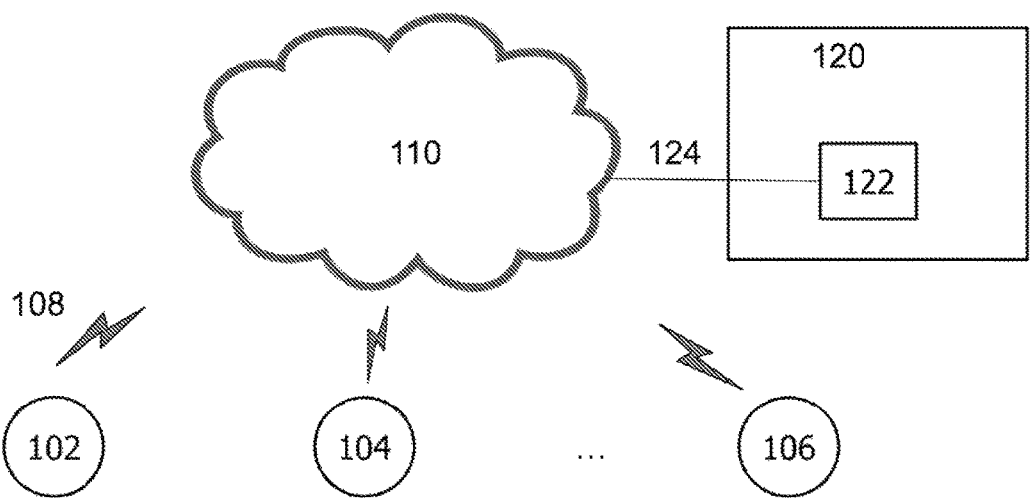
FIG. 1 shows exemplary safety monitoring sensors and monitoring center.

FIG. 1 shows exemplary safety monitoring sensors and a monitoring center. The system has one or multiple battery powered remote sensors (such as sensor 102, 104, and 106), one or more remote sensing systems (RSS) and one or more servers (such as server 122) that are located in monitoring center(s) 120. Monitoring center and remote sensing systems are connected through network 110. RSS uses wireless link (such as link 108) for connection with network 110; monitoring center may use either wired or wireless access (such as 124) for connection with network 110, and further to all the remote sensing systems. An RSS reports its working condition (e.g., whether working properly; temperature, humidity, and so on) and the monitored result (e.g., gas concentration) through wireless link 108 to the monitoring center. For better description, the following description assumes the RSS a Methane monitoring system in a manhole, though the method can be used in other systems as well.

Figure 2:
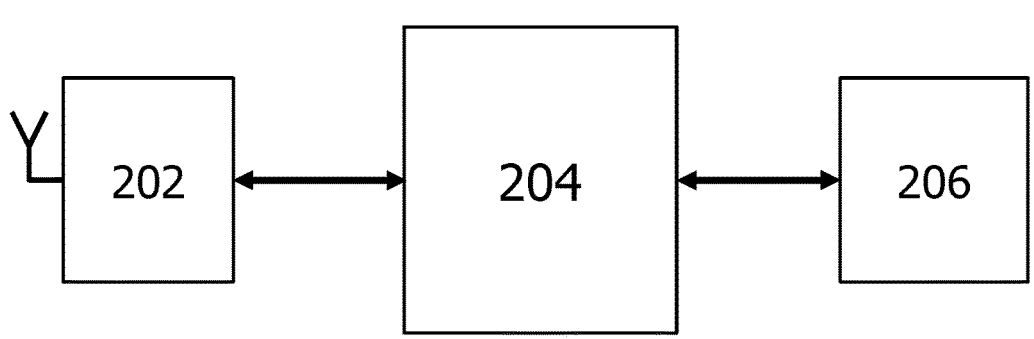
FIG. 2 shows an exemplary internal structure of the remote sensor.

FIG. 2 shows an exemplary internal structure of the remote sensor. The basic element of each RSS includes a microcontroller 204, local sensor 206, and wireless module 202. Microcontroller 204 provides local intelligence for the functions of local control, sensing data acquisition, local decision, and the interaction with monitoring center through external communication. Local sensor 206 is the application specific sensor, such as Methane (CH4) concentration detector. Wireless module is responsible for setting up the communication link and provide data path between microcontroller 204 and the central server 122. Microcontroller 204 can be in either sleeping mode or active mode. Wireless module 202 can be powered on and off by microcontroller 204. Depending on sensor 206's power consumption, its power supply can be either controlled by microcontroller or always on.

The system defines a first threshold Th1 and a second threshold Th2. Gas concentration below Th1 is called normal condition, which is background concentration plus sensor noise level. Level above Th2 is alarm condition, in which actions need to be taken. Level between Th1 and Th2 is called alert condition, in that the concentration is more frequently monitored and reported if necessary.

In normal condition, an RSS (in particular the microcontroller 204) reads sensor data in fixed interval T1. T1 is application specific; it can be the trade-off among battery capacity, local sensor power consumption, the status of the object under monitoring, the possible hazard happening speed, and so on. In particular for a gas pipe, interval T1 might be based on pipe condition (such as years in service and pressure), estimated leaking speed and the time to reach explosion level, etc. T1 is pre-configured and can be dynamically modified from monitoring center. To reduce power consumption, in normal condition, RSS activates wireless module 202 in interval Tw, with Tw>T1. Once wireless module is activated and wireless connection is available, RSS reports the necessary items to server 122. Such items may include sensor data captured since last report, environmental condition, and equipment condition, or simply an abstracted message such as "normal". Such report also makes the server aware that the RSS is working properly. Interval Tw is determined by the confidence to the RSS (i.e., the possibility that the RSS fails during interval Tw), the total power consumption of each activation period, and the expected battery life. Like T1, interval Tw can also be modified from the server (or the monitoring center). For example if the confidence to an RSS drops, the monitoring center may prefer to know its working condition more frequently which is to reduce Tw.

Alert condition needs the RSS to process intelligently. In one embodiment, once the RSS enters alert condition, the microcontroller shortens T1 to T2 (T2<T1), to read N times of sensor data (lasting time (N−1)*T2) to determine the trend. In one embodiment, N can be dynamic, depends on the decision algorithm; T2 can also be dynamic according to each detected concentration. With these sensing data, the RSS is able to figure out whether the concentration is constant, or decreasing, or increasing. If constant or decreasing, the RSS may update Th1 to Th1' (Th1'>Th1), then change back to detection interval T1; each time it may update Th1' with newly read data (or plus noise level) until Th1' reaches Th1. In one embodiment, sensor data read interval T1 may be changed according to (Th2−Th1'). In one embodiment, T1 can be updated to T1'=T1*(Th2−Th1)/(Th2−Th1') which means inversely proportional to the difference between Th2 and Th1'. For this procedure, the reporting interval Tw remains unchanged; in between each two reads, the microcontroller and sensor can be put in sleep or power off mode, as in normal operation. For each report sending to the server, the RSS may send all the data it captured during the interval, or a typical one and the changed threshold if applied. If the concentration is increasing, the trend such as the slope is calculated, and a first notice is sent to the central server with N data and the estimated trend. In one embodiment, the server has its own intelligent element to predict the trend and notify the operator if necessary. Monitoring interval T1 is updated according to the increasing rate (the slope) and current concentration; it can be pre-stored in the microcontroller memory. In one embodiment, RSS reports to central server each time the concentration increases by step S1. If slope reaches SL, RSS may send alert to central server immediately. Depends on wireless connection establishing time and power consumption, the RSS may decide whether to turn off wireless link or keep it alive while not reporting.

Once gas concentration reaches Th2, wireless link will be always on and reports with each data the microcontroller reads from the sensor. Central server may optionally reduce the reporting interval or turn the system off once service people are on site.

Figure 3:
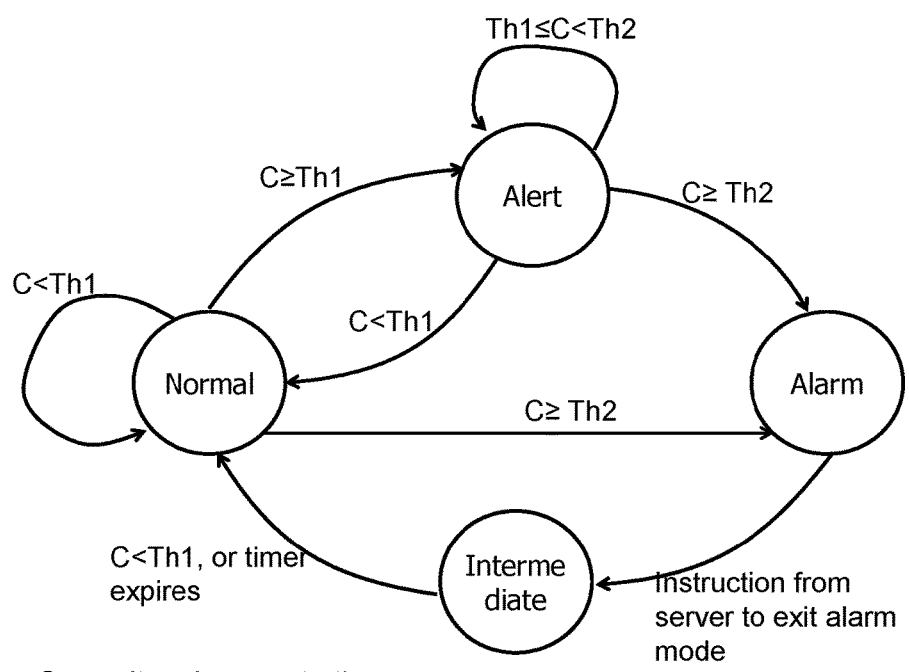
FIG. 3 shows exemplary RSS working state transition.

FIG. 3 shows an exemplary RSS operating state transition diagram. In normal state, if monitored concentration (C) is higher than Th2, the RSS enters alarm state directly; otherwise if higher than Th1, the RSS enters alert state; if C<Th1, the RSS stays in normal state. In alert state, if C≥Th2, the RSS enters alarm state; otherwise stays in alert state (C≤Th1<Th2), or change back to normal state (C<Th1). The alert state has more intelligent processing rather than simple comparison, which will be explained below with further diagram. As mentioned that threshold Th1 may be modified in alert state, in which case when switched back to normal state, the microcontroller will reduce the threshold with monitored data until reaches Th1. When C reaches Th2, the RSS enters alarm state. The system will exit from alarm state to intermediate state only when instructed by server, which means action has been taken. Intermediate state is added to avoid repeated alarm, in which the RSS has a timer which is pre-configured or set by instruction from the server. Once the monitored concentration is below Th1 (or a new Th1' that is configured by the central server), or the timer expires, the RSS will change from intermediate state to normal state.

Figure 4:
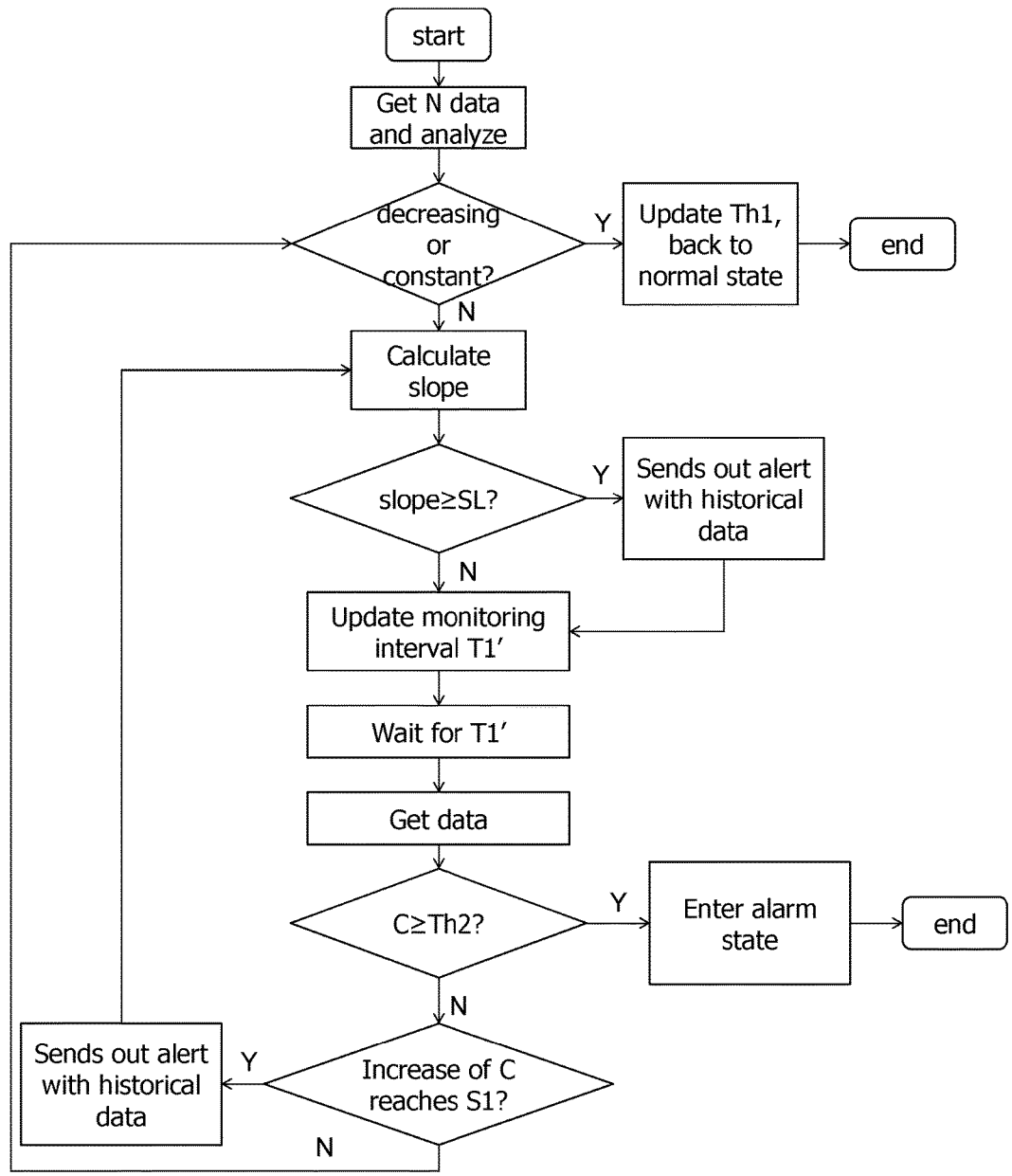
FIG. 4 shows an exemplary processing flow chart inside alert state.
Figure 5:
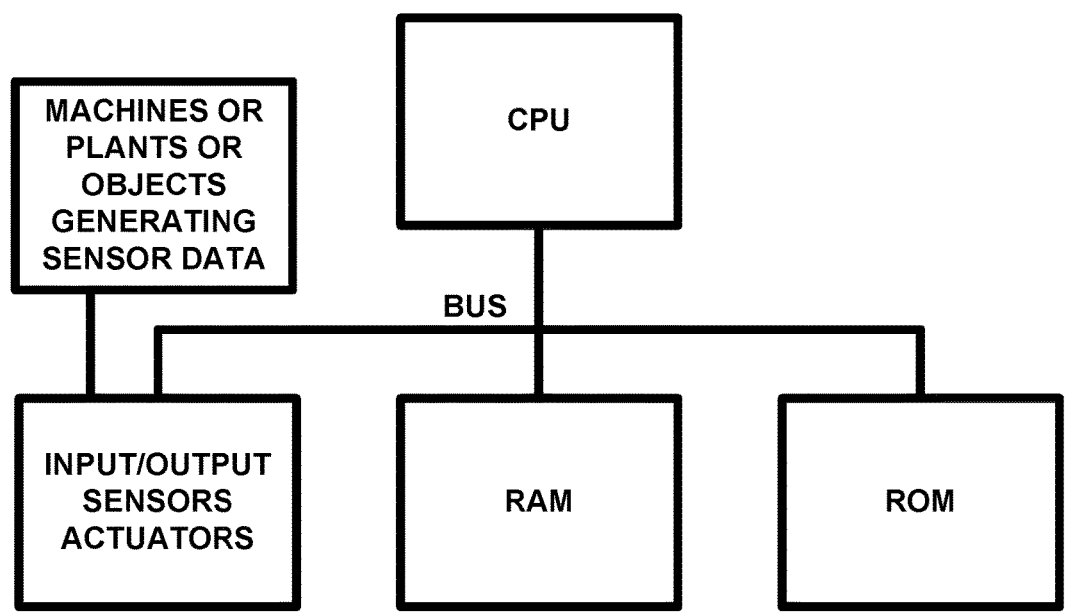
FIG. 5 shows an exemplary computer to process time series data from sensors and operating actuators in response thereto.

FIG. 4 shows an exemplary processing diagram inside alert state. Once entered, the RSS first gets a set of data (with pre-configured interval) and analyzes whether the concentration is constant, increasing, or decreasing. If constant or decreasing, threshold Th1 may be updated to Th1' and back to normal state. Otherwise the RSS calculates the increasing slope. If the slope is larger than SL, the RSS reports with alert message immediately (optionally with historical data). Local monitoring interval T1 is updated (shortened) to T1' and the RSS waits for T1' period to get the next concentration. If the newly gotten concentration C reaches Th2, the RSS enters alarm state; otherwise if the difference from last value is larger than S1, the RSS reports with alert message. This procedure is repeated as shown in the flow chart. Note that the RSS needs several iterations before deciding "decreased or constant" value, to avoid failed alarm.

When wireless link is established between the RSS and the server, the server (or the monitoring center) may send configuration message to the RSS, such as modification to threshold and monitoring interval T1, reporting interval Tw, etc. The new configuration may reflects field learning result and/or system working condition changes; it can be written into RSS flash memory if the microcontroller is powered off when system enters sleeping mode. Field learning is carried out by machine learning software running in central server.

The system achieves a separation of wireless connection from local monitoring in normal operation mode, in that local monitoring guarantees no failed detection, while wireless connection keeps the central server informed that the remote sensing system is working properly.

The system also provides intelligence in the alert state, in that if the detected value is constant or decreasing, the remote system may back to normal state with updated threshold to reduce power consumption, while maintaining the confidence of low detected value; if the detected value is increasing, it calculates the increasing slope and informs central server when necessary, even the detected value is below the threshold, to make sure action is taken in the earliest possible time; if the detected value increases by certain level then activates the wireless link and reports to the central server, so that the central monitoring station knows the progress and may make their intelligent decision. Such operation guarantees no failed or delayed report, with the lowest possible power consumption.

The system is advantageous through the separated operation of local monitoring and reporting to central server in normal mode, and the intelligence as described in the flow chart of FIG. 4 when the system is in alert state.

The invention may be implemented in hardware, firmware or software, or a combination of the three. FIG. 6 shows an exemplary computer to process time series data from sensors and operating actuators in response thereto. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. For example, the I/O interface can receive data from sensors. In the broadest definition, a sensor is an object whose purpose is to detect events or changes in its environment, and then provide a corresponding output. A sensor is a type of transducer; sensors may provide various types of output, but typically use electrical or optical signals. For example, a thermocouple generates a known voltage (the output) in response to its temperature (the environment). A mercury-in-glass thermometer, similarly, converts measured temperature into expansion and contraction of a liquid, which can be read on a calibrated glass tube. Sensors are used in everyday objects such as touch-sensitive elevator buttons (tactile sensor) and lamps which dim or brighten by touching the base, besides innumerable applications of which most people are never aware. With advances in micro machinery and easy-to-use micro controller platforms, the uses of sensors have expanded beyond the most traditional fields of temperature, pressure or flow measurement sensors. Moreover, analog sensors such as potentiometers and force-sensing resistors are still widely used. Applications include manufacturing and machinery, airplanes and aerospace, cars, medicine, and robotics, among others. A sensor's sensitivity indicates how much the sensor's output changes when the input quantity being measured changes. For instance, if the mercury in a thermometer moves 1 cm when the temperature changes by 1° C., the sensitivity is 1 cm/° C. (it is basically the slope Dy/Dx assuming a linear characteristic). Some sensors can also have an impact on what they measure; for instance, a room temperature thermometer inserted into a hot cup of liquid cools the liquid while the liquid heats the thermometer.

The I/O interface can also control actuators such as motors. An actuator is a type of motor that is responsible for moving or controlling a mechanism or system. It is operated by a source of energy, typically electric current, hydraulic fluid pressure, or pneumatic pressure, and converts that energy into motion. An actuator is the mechanism by which a control system acts upon an environment. The control system can be simple (a fixed mechanical or electronic system), software-based (e.g. a printer driver, robot control system), a human, or any other input. A hydraulic actuator consists of cylinder or fluid motor that uses hydraulic power to facilitate mechanical operation. The mechanical motion gives an output in terms of linear, rotary or oscillatory motion. Because liquids are nearly impossible to compress, a hydraulic actuator can exert considerable force. The drawback of this approach is its limited acceleration. The hydraulic cylinder consists of a hollow cylindrical tube along which a piston can slide. The term single acting is used when the fluid pressure is applied to just one side of the piston. The piston can move in only one direction, a spring being frequently used to give the piston a return stroke. The term double acting is used when pressure is applied on each side of the piston; any difference in pressure between the two side of the piston moves the piston to one side or the other. Pneumatic rack and pinion actuators for valve controls of water pipes. A pneumatic actuator converts energy formed by vacuum or compressed air at high pressure into either linear or rotary motion. Pneumatic energy is desirable for main engine controls because it can quickly respond in starting and stopping as the power source does not need to be stored in reserve for operation. Pneumatic actuators enable large forces to be produced from relatively small pressure changes. These forces are often used with valves to move diaphragms to affect the flow of liquid through the valve. An electric actuator is powered by a motor that converts electrical energy into mechanical torque. The electrical energy is used to actuate equipment such as multi-turn valves. It is one of the cleanest and most readily available forms of actuator because it does not involve oil. Actuators which can be actuated by applying thermal or magnetic energy have been used in commercial applications. They tend to be compact, lightweight, economical and with high power density. These actuators use shape memory materials (SMMs), such as shape memory alloys (SMAs) or magnetic shape-memory alloys (MSMAs). A mechanical actuator functions by converting rotary motion into linear motion to execute movement. It involves gears, rails, pulleys, chains and other devices to operate. An example is a rack and pinion.

Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A sensing platform, comprising:
   a server;
   one or more remote sensing systems coupled to the central server, including:
      one or more local sensor(s) for target object monitoring;
      a wireless module coupled to a network through wireless a link; and
      a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system;
   wherein the sensing system detects a second threshold Th2, that if a detected value is above Th2, the sensing system enters alarm state and sends alarm message to server; and
   wherein the sensing system exits alarm state to intermediate state when receives instruction from server.

2. A sensing platform, comprising:
   a server;
   one or more remote sensing systems coupled to the central server, including:
      one or more local sensor(s) for target object monitoring;
      a wireless module coupled to a network through wireless a link; and
      a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system;
   wherein the sensing system detects a second threshold Th2, that if a detected value is above Th2, the sensing system enters alarm state and sends alarm message to server; and
   wherein the sensing system exits from intermediate state when detected value is below threshold Th3 or a timer expiration.

3. A sensing platform, comprising:
   a server;
   one or more remote sensing systems coupled to the central server, including:
      one or more local sensor(s) for target object monitoring;
      a wireless module coupled to a network through wireless a link; and
      a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system;
   wherein the sensing system enters an alert state when a detected value is in between Th1 and Th2; and
   wherein the sensing system enters an alert state, receives N value in period P and performs local analysis.

4. A sensing platform, comprising:
   a server;
   one or more remote sensing systems coupled to the central server, including:
      one or more local sensor(s) for target object monitoring;
      a wireless module coupled to a network through wireless a link; and
      a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system;
   wherein the sensing system enters an alert state when a detected value is in between Th1 and Th2; and
   wherein the sensing system outputs a trend with a constant value or decreased value and the sensing system updates threshold Th1 and returns to a normal state.

5. A sensing platform, comprising:
   a server;
   one or more remote sensing systems coupled to the central server, including:
      one or more local sensor(s) for target object monitoring;
      a wireless module coupled to a network through wireless a link; and
      a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system;
   wherein the sensing system enters an alert state when a detected value is in between Th1 and Th2; and wherein the sensing system outputs a trend with an increased value, and an increasing slope is larger than a predetermined value, then the sensing system activates the wireless module and sends alarm to the server.

6. A sensing platform, comprising:
a server;
one or more remote sensing systems coupled to the central server, including:
  one or more local sensor(s) for target object monitoring;
  a wireless module coupled to a network through wireless a link; and
  a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system; and
wherein a difference from last reports exceeds a predetermined threshold, then the sensing system activates wireless link and sends alarm to server.

7. A sensing platform, comprising:
a server;
one or more remote sensing systems coupled to the central server, including:
  one or more local sensor(s) for target object monitoring;
  a wireless module coupled to a network through wireless a link; and
  a processor to read data from local sensor(s), and communicate information through the network using the wireless module, wherein the sensing system has a low power consumption mode where the processor puts the wireless module and the local sensor(s) in sleep mode or powered off, wherein the processor has a sleep or deep sleep mode, a power-off mode, and a wake up mode, wherein the local sensor(s) are accessed at a frequency 1/T1 and the wireless module is at lower frequency 1/Tw where Tw>T1, wherein the server receives monitored value from remote sensing systems and interacts with the remote sensing system;
wherein the sensing system enters an alert state when a detected value is in between Th1 and Th2; and
wherein in an alert state, if the trend shows constant or decreased value, the sensing system updates a threshold and returns to normal state.

* * * * *